United States Patent

[11] 3,564,258

[72] Inventor Bernard R. Feingold
     Pennsauken, N.J.
[21] Appl. No. 743,192
[22] Filed July 8, 1968
[45] Patented Feb. 16, 1971
[73] Assignee By mesne assignments to the United
     States of America as represented by the
     Secretary of the Navy

[54] MAGNETIC MASER SATURATION PROTECTION SWITCH
7 Claims, 4 Drawing Figs.

[52] U.S. Cl. .................................................. 250/199,
     330/4, 331/94, 343/17.1
[51] Int. Cl. .................................................. H04b 9/00
[50] Field of Search .......................................... 250/199;
     331/94.5, 94; 325/485; 330/4.3, 4, (Inquired)

[56] References Cited
UNITED STATES PATENTS
3,277,396  10/1966  Statz .............................. 332/16

Primary Examiner—Robert L. Griffin
Assistant Examiner—Kenneth W. Weinstein
Attorneys—A. L. Branning, R. S. Ciascia and M. L. Crane ABSTRACT: The present invention utilizes a switching coil in conjunction with a traveling wave maser means to enable the use of a maser crystal in a radar system. The switching coil is placed within the confines of the wall of the waveguide within which the maser is located and is connected with a power supply that produces a current flow that produces an additional magnetic field. The additional magnetic field detunes the maser for a time period equal to the radio frequency pulse transmitted by the radar system.

INVENTOR
BERNARD R. FEINGOLD

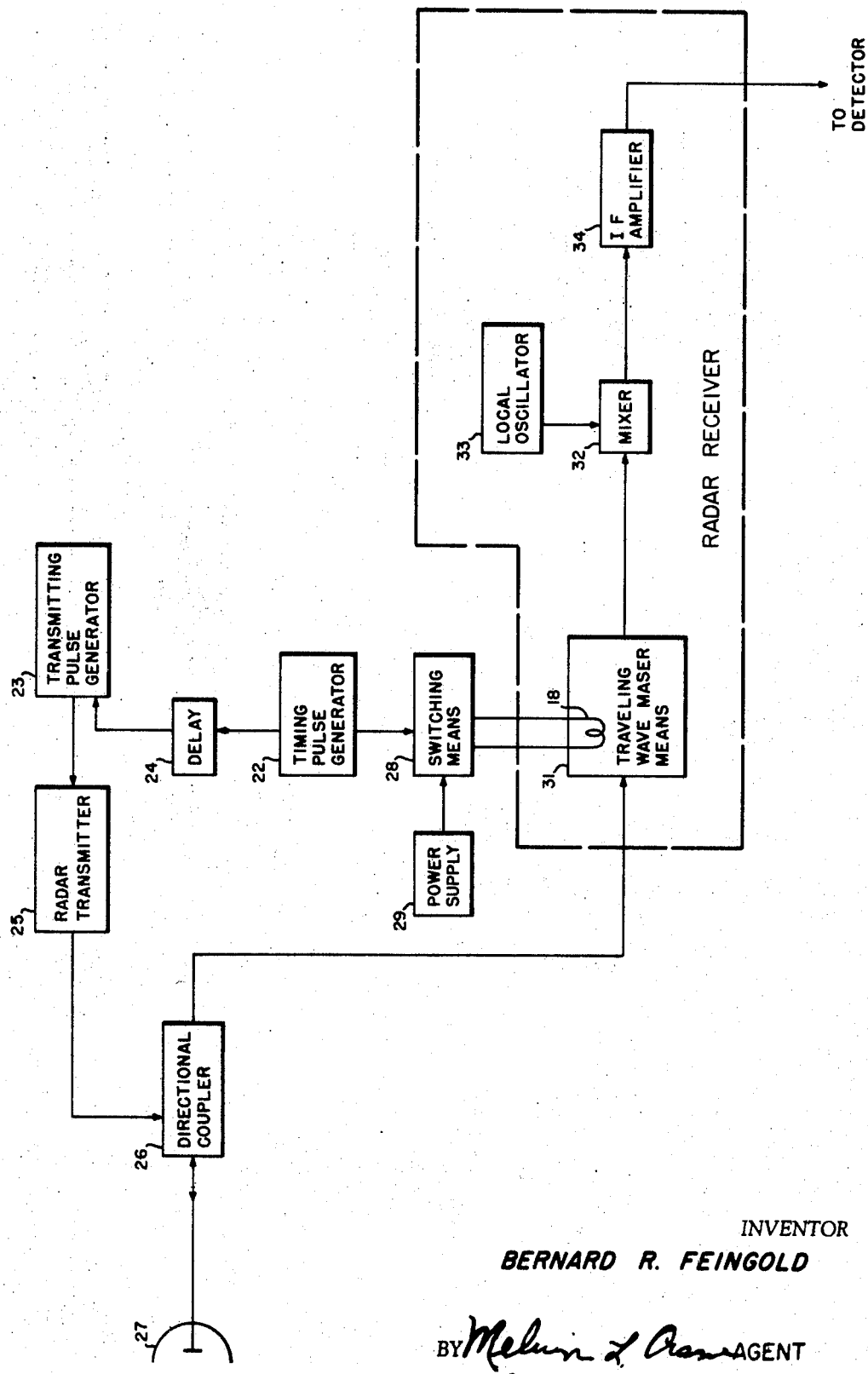

MAGNETIC MASER SATURATION PROTECTION SWITCH

The present invention is directed to a means for preventing a maser from becoming saturated during use in a Radar system.

It is well known in the art that solid state masers are used for the amplification of high frequency signals by the utilization of stimulated emission. Maser devices are normally used in radio telescopes and satellite communication ground stations which requires the use of their antenna to only receive signals. Masers are now used in radar systems which use a single antenna to both transmit and receive signals. In these systems, although protection devices are used, high intensity signals leak from the radar transmitter and find their way to the maser element. These signals are so large that the maser becomes saturated, that is, loses its ability to amplify. It has been determined that it takes a maser about 10 milliseconds to recover from saturation, and this "off time" makes the maser impractical for radar use since the radar repetition rate is so high that the maser will not recover from saturation. Thus, the radar is blind to weak targets within 800 miles. This invention overcomes the problems mentioned by providing a system or means by which the effect of transmitter leakage into the maser is offset to enable use of a maser in a radar system.

The natural operational phenomena of a maser is well known in the art and it is believed unnecessary to go into great detail in the description thereof. Such a description is adequately given in U.S. Pat. Nos. 2,909,654 and 3,117,282. Mechanically, a solid-state traveling-wave-maser is an extremely rugged device which can withstand large input signals without any deleterious effects on the physical structure of the maser. About the only negative effect produced by a high level input is that the maser saturates and loses its ability to amplify a signal. Saturation is brought about by too large an input signal which stimulates transitions down from excited levels faster than the excited levels are filled, which requires a few milliseconds in time.

For radar applications, the natural recovery time of a maser is too long, therefore a system must be provided to prevent the depletion of the excited states. It has been determined that a maser can be detuned by shifting the magnetic field within which it operates. By shifting the magnetic field the signal frequency will not be able to induce transitions and will therefore pass right through the maser. After the saturation signal has passed, the magnetic field is returned to its proper value and the maser will be in a proper state to amplify the input signal. The magnetic field is caused to be shifted for only a short time therefore the maser will be detuned for only a short time and the number of excited levels lost due to thermal relaxation is small.

The recovery time of the maser is dependent on how quickly the magnetic field can be changed back to its original value. Therefore, a means for preventing a maser from becoming saturated involves a means for producing rapid changes in the magnetic field at the maser crystal. It has been determined that the magnetic field (switching field) producing the change must be in the same plane as the DC magnetic field required for operation of the maser and must be of sufficient magnitude to decouple the maser from the saturation signal. The switching field does not require uniformity and it may either add or subtract from the normal DC field. For a DC field of about 2.2K Gauss in the main field the decoupling field may be approximately 90 Gauss. Not only is a decoupling field of sufficient size required but the speed is also important. The switching field must be pulsed with a rise time in the order of microseconds to prevent excessive nonuse time for the maser. It has been determined that it takes 5 microseconds for the switching field to build up at the crystal thereby requiring triggering of the switching field 5 microseconds ahead of the saturating pulse. The saturation pulse is operative for 10 microseconds and the recovery time of the maser is 15 microseconds per pulse as measured from the end of the radar transmission pulse.

This invention is directed to a means for preventing the maser crystal from becoming saturated by changing the magnetic field about the crystal. During the saturation pulse, the protection switch of this invention changes the magnetic field to a higher value thereby tuning the maser to a higher frequency thereby detuning the maser from the normal operating frequency. Therefore the maser will not absorb energy and the amplifier will not become saturated. At the end of the saturating pulse, the magnetic field is switched back to its original value which permits amplification of a signal at the normal operating frequency. The time required before the maser is ready to amplify is determined by the time required to apply the higher magnetic field and switch back to normal operating conditions.

It is therefore an object of the present invention to provide a novel means for preventing saturation of a maser in a radar system due to saturating transmitter leakage.

Another object is to provide a novel means for preventing saturation of a maser in a radar system with a minimum of off time.

Still another object is to provide a simple means for preventing saturation of a maser in a system that both sends and receives signals without contributing any additional noise to the system.

Yet another object is to provide a simple means for preventing saturation of a maser in a radar system with a minimum of change in the structure well known in the art.

Other and more specific objects of this invention will become apparent upon a careful consideration of the following detailed description when taken together with the accompanying drawings, in which:

FIG. 2 illustrates a block diagram of a radar system including the maser means illustrated in FIG. 1;

Figure 1:
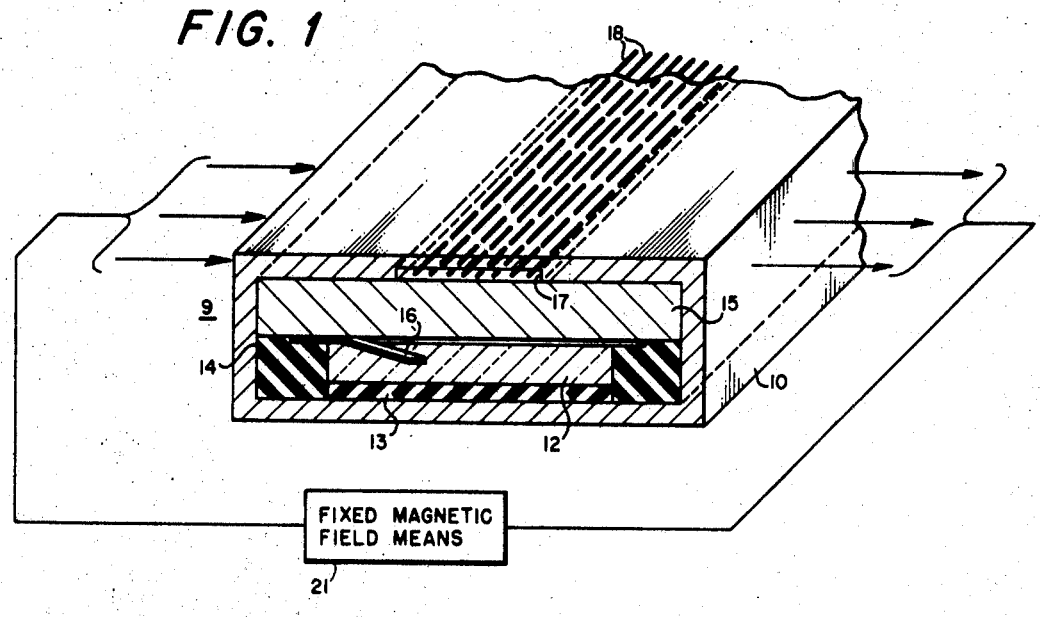
FIG. 1 illustrates a particular structure for a traveling wave maser means.

Referring now to FIg. 1, there is shown for illustrative purposes a traveling wave maser means suitable for a preamplifier in a radar tracking system. The view also illustrates a maser saturation protection means in combination with the maser means which enables use of the maser as a preamplifier for a radar system. As shown, the traveling wave maser means 9 including the saturation protection means comprises a brass waveguide 10 into which pump energy is supplied by a pumping frequency source. A negative temperature medium 12 made of a crystal such as iron doped rutile ($Fe^{+3}TiO_2$) positioned on a sapphire insulator 13 is placed within the waveguide with the sapphire insulator adjacent to the waveguide surface. The crystal is spaced from the sides by use of Rexolite spacers 14. A ferrite board 15 to which a meander line 16 has been placed is placed within the waveguide cavity over the crystal with the meander line adjacent to the crystal. As shown, one of the cavity walls has a cutout 17 therein along the inner surface thereof along which a plurality of wires 18 of a coil extend. The wires are connected to a voltage supply which upon actuation produces a current through the wires that produces a magnetic field about the wires. A fixed magnetic field means 21 applies a predetermined fixed magnetic field transverse to the axis of waveguide 10 in cooperative relationship with the negative temperature medium or crystal 12. The input signal is applied to the meander line 16, and propagates in a traveling wave mode along the meander line to produce an output at the opposite end of the waveguide. It is obvious to one skilled in the art that a traveling wave maser means is normally operated within a cryogenic environment (not shown for simplification of the drawing) to obtain low noise performance.

Referring now to FIG. 2, there is shown by illustration, a radar system within which the above-described maser means is employed as the first stage of a receiver. A timing pulse generator 22 generates a pulse which is fed to the transmitting pulse generator 23 through a 5 microsecond delay 24. The transmitting pulse generator generates a sequence of pulses that are timed to begin with the timing pulse directed thereto and has a duration desired for the pulses from the transmitter are directed through a directional coupler 26 to an antenna 27 which transmits the signals into the atmosphere. The timing pulse generator, delay, and transmitting pulse generator may be considered a part of the transmitter.

Simultaneous with transmitting a pulse from the timing pulse generator through the delay to the transmitting pulse generator, a timed pulse is directed to a switching means 28 which controls the power input to the switching "coil" 18 in the traveling wave maser. Echo pulses received by the antenna are applied to the traveling wave maser means 31 of the radar receiver through the directional coupler coupler 26. It is well known in the art that a low loss duplexer may be substituted for the directional coupler. The radar receiver further includes a mixer 32 which receives the output from the traveling wave maser means and the output from a local oscillator 33. The output of mixer 32 is applied to the input of an IF amplifier 34 and the output of the IF amplifier is directed to the detector of the radar receiver and then to the readout of the radar (not shown for simplification of the drawings).

The "coil" 18 must be switched by at least 90 Gauss. Such a field can be produced by eight parallel wires carrying a current of 12 amperes each. This configuration has a rise time of approximately 3 microseconds to build up the switching magnetic field to the proper value. Thus, it is required to provide a 5 microseconds delay in the beginning of the transmitter pulse. However, the switching pulse is turned off simultaneously with the RF transmitter pulse.

Figure 3:
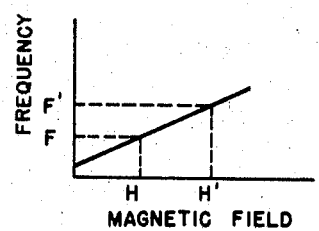
FIG. 3 illustrates a variation in the maser frequency with the magnetic field produced by the saturation protection switch.

Switch operation to prevent saturation of the maser makes use of the fixed relationship that exists between the signal frequency of the maser and the fixed DC magnetic field as shown in FIG. 1. Just prior to and during the saturating pulse from the transmitter, the protection switch changes the magnetic field from the fixed value H to H', as shown in FIG. 3, thereby tuning the maser to a new frequency F' and detuning the maser at the transmitter frequency F, as shown in FIG. 3. Therefore the maser crystal will not absorb energy and the amplifier will not be saturated. At the end of the transmitting pulse (saturating pulse), the field is switched back to H, by removing the switching field, and a signal at frequency F, as received from the antenna, can be amplified. The time required for the maser to become ready to amplify again is determined by the speed with which the magnetic field is switched back to H.

Figure 4:
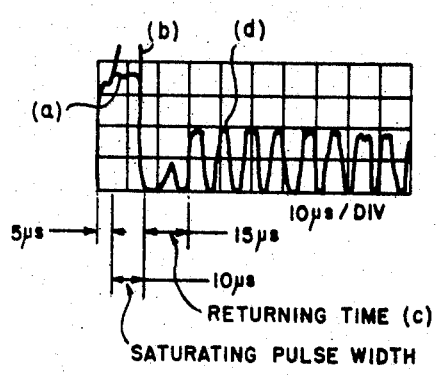
FIg. 4 illustrates the pulse relationships.

FIG. 4 illustrates the pulse relationship of the saturating pulse, the protection switching pulse, and the received pulses (amplified), with respect to time. As pointed out above, there is a 5 microsecond pulse delay between the start of the detuning (switching) pulse (a) and saturating (transmitter) pulse (b), which permits the protecting magnetic field to build up prior to transmitting the 10 microsecond transmitter (saturating) pulse. The protection switching pulse is held on for the same amount of time as the transmitting pulse. After removing the protection switching pulse, there is required a 15 microseconds time (c) for the magnetic field to return to normal operating conditions which time is designated as the retuning time. After a 30 microseconds period from the beginning of the time pulse for the switching means, the maser is in condition to operate normally for amplifying the received pulses (d), as shown.

In operation, the value of the fixed magnetic field is such that the traveling wave maser means, in the absence of a current pulse through "coil" 18, is tuned to the frequency of the exploratory pulses transmitted and the echo pulses received by the antenna whereby the traveling wave maser means is effective in amplifying echo pulses received by antenna 27. However, during the interval in which each exploratory pulse is in the process of being transmitted, a current pulse is applied to "coil" 18. Therefore during these intervals, the traveling wave maser means is detuned from the operating frequency of the radar transmitter 25. Thus, the traveling wave maser means will not be effective during the transmission of each exploratory pulse in amplifying any electromagnetic energy at the operating frequency of the transmitter which may be coupled thereto. Therefore the traveling wave maser means is operative for amplifying signals received by the antenna only when there is no current flow through the switching "coil" 18.

Since the operation of the switching means has been described sufficiently and the operation of a radar system is well known in the art, it is believed that the overall operation of the radar system is not necessary in this application.

Obviously many modifications and variations of the present invention are possible in the light of the above teachings. It is therefore to be understood that within the scope of the appended claims the invention may be practiced otherwise than as specifically described.

I claim:

1. In a signal transmitter-receiver system which includes a waveguide with a tunable maser means therein tuned to receive and amplify echo pulses transmitted by the transmitter, comprising:
   a maser detuning means for detuning said maser means during transmission pulses;
   said maser detuning means including a plurality of side-by-side wires; and
   said wires lying within said waveguide and extending linearly along one side of a said tunable maser means within said waveguide.

2. A method of preventing a tunable maser means operated within a constant magnetic field in a signal transmitter-receiver system from becoming saturated during pulse transmission; which comprises:
   shifting the magnetic field from its normal operating strength for a period during a transmission pulse to detune said maser means; and
   returning the magnetic field to normal operating strength subsequent to the end of the transmission pulse thereby tuning said maser means to its normal operating state.

3. A method as claimed in claim 2; wherein, said magnetic field is shifted to a greater value during the transmission period than that at normal operating strength.

4. A method as claimed in claim 2; wherein:
   said magnetic field strength is shifted just prior to the beginning of a transmission signal; and
   for a period just longer than said transmission period.

5. A method as claimed in claim 4; wherein, said magnetic field strength is shifted approximately five (5) milliseconds prior to initiation of the transmission signal.

6. A method as claimed in claim 2; which comprises, applying a separate magnetic field to the normal magnetic field for shifting the strength of the normal magnetic field.

7. A method as claimed in claim 6; which includes, applying said separate magnetic field in the same plane as said normal magnetic field.